United States Patent [19]

Naudin et al.

[11] Patent Number: 4,903,544
[45] Date of Patent: Feb. 27, 1990

[54] DOUBLE DAMPED FLYWHEEL, ESPECIALLY FOR AUTOMOTIVE VEHICLES

[75] Inventors: Jacky Naudin, Ermont; Jacques Paquin, Villeneuve-la-Garenne, both of France

[73] Assignee: Valeo, Paris, France

[21] Appl. No.: 300,840

[22] Filed: Jan. 24, 1989

[30] Foreign Application Priority Data

Jan. 25, 1988 [FR] France ................. 88 00805

[51] Int. Cl.$^4$ ............................................. F16F 15/10
[52] U.S. Cl. ....................................... 74/574; 192/106.2
[58] Field of Search ............................... 74/574, 573 F; 192/106.1, 106.2, 58 A; 464/7, 24, 27, 28, 64, 66, 68

[56] References Cited

U.S. PATENT DOCUMENTS

| | | | |
|---|---|---|---|
| 986,498 | 3/1911 | Raders | 464/27 |
| 1,693,765 | 12/1928 | Parsons et al. | 74/574 X |
| 3,653,228 | 4/1972 | Tiberio | 464/24 |
| 4,351,167 | 9/1982 | Hanke et al. | 464/24 |
| 4,777,843 | 10/1988 | Bopp | 74/574 |

FOREIGN PATENT DOCUMENTS

| | | |
|---|---|---|
| 0251849 | 1/1988 | European Pat. Off. . |
| 3610127 | 12/1986 | Fed. Rep. of Germany . |
| 3712876 | 11/1987 | Fed. Rep. of Germany . |
| 2571461 | 4/1986 | France . |
| 2175067 | 11/1986 | United Kingdom . |
| 2194020 | 2/1988 | United Kingdom ............ 464/68 |
| 2194834 | 3/1988 | United Kingdom ............ 464/68 |

Primary Examiner—Rodney M. Lindsey
Attorney, Agent, or Firm—Charles E. Brown; Charles A. Brown

[57] ABSTRACT

The present invention is concerned with a double damped flywheel for use in automobiles. The flywheel has two masses which delimit a first sealed cavity. The first sealed cavity is filled with a first fluid and has a resilient spring disposed within its cavity. A viscous damper is mechanically interposed between the two masses and includes a second sealed cavity which is delimited by the two masses. The second sealed cavity is filled with a second fluid which is different from the first fluid. The second sealed cavity is located generally inwardly of the first sealed cavity.

5 Claims, 2 Drawing Sheets

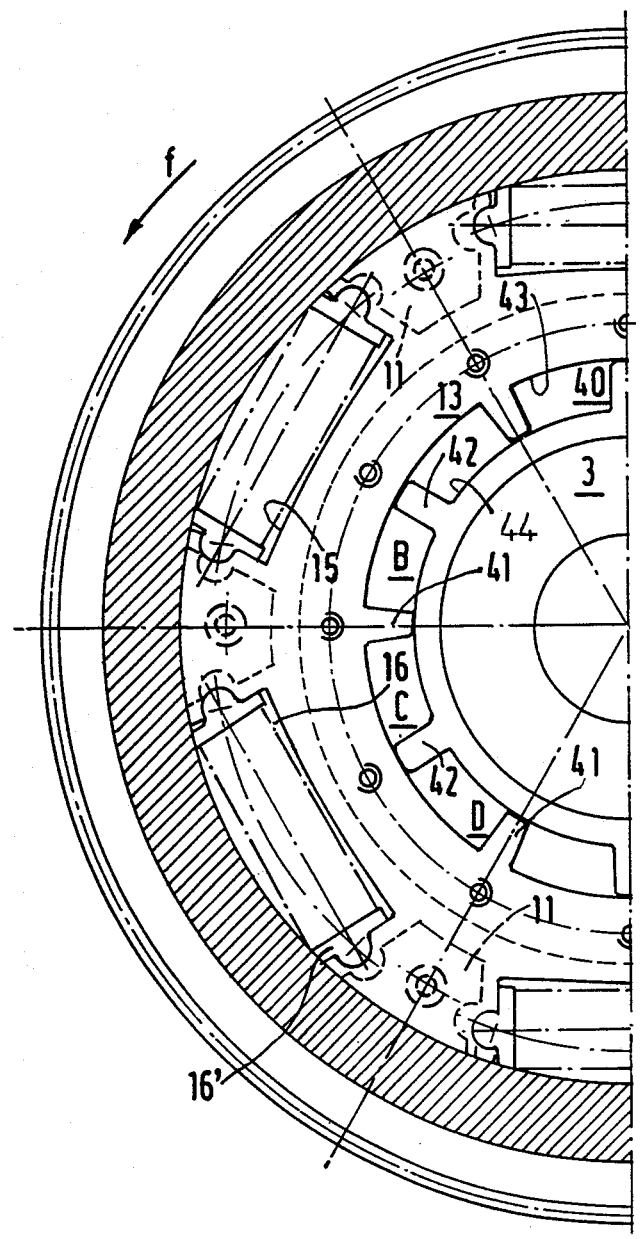
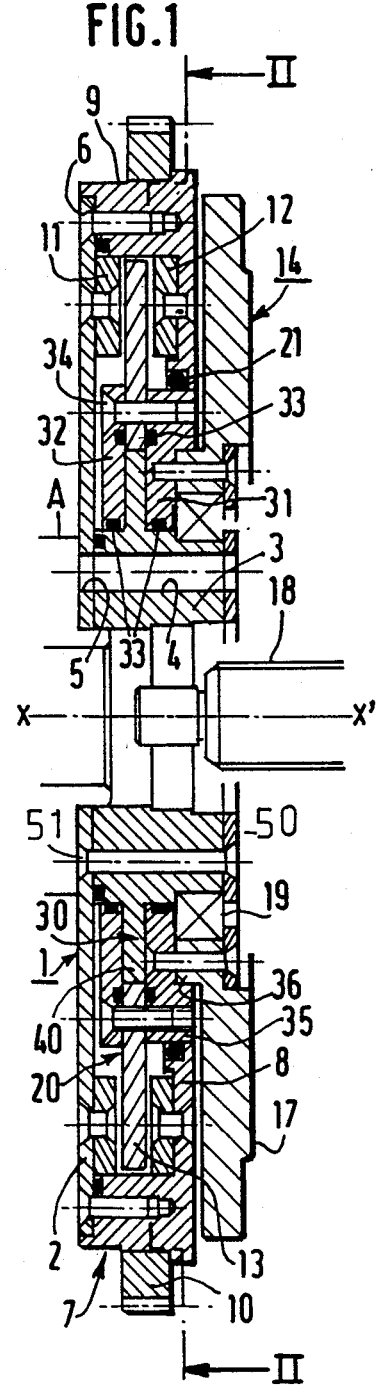
FIG. 2
FIG. 1

DOUBLE DAMPED FLYWHEEL, ESPECIALLY FOR AUTOMOTIVE VEHICLES

FIELD OF THE INVENTION

The present invention is concerned with a double damped flywheel, particularly for automotive vehicles, and being of the kind comprising two coaxial masses which are mounted for rotation relative to each other against the action of resilient means.

BACKGROUND OF THE INVENTION

In a double flywheel, such as that described in French published patent application FR 2 571 461A, the resilient means are housed on a pitch circle of larger diameter, and the angular displacement between the two masses in relative rotation is large. Consequently the resilient means are subjected to very high compressing forces, especially under the action of centrifugal force.

In order to reduce the wear and the noise resulting from this high deformation of the resilient means, the resilient means may be conceived as being housed within a sealed cavity which is filled with a lubricating fluid.

It may also be desirable to use a viscous damping means with a view to an effective reduction in unwanted vibrations.

If the lubricating fluid is used in the viscous damper, a problem arises from the characteristics of the fluid, since one single fluid cannot, in general, satisfactorily be used both for lubricating the resilient means and for the purposes of viscous damping.

SUMMARY OF THE INVENTION

An object of the present invention is to overcome these disadvantages, and thus to provide a double damped flywheel incorporating both lubrication of its resilient means and also having viscous damping means to reduce or eliminate vibration, besides obtaining other advantages.

According to the invention, in a double damped flywheel of the kind described above the said masses, namely a first and a second mass, delimit a first sealed cavity, the double damped flywheel further comprising means accommodating the said resilient means within the first cavity and the latter being filled with a first fluid, a viscous damping means being mechanically interposed between the two masses and comprising a second sealed cavity delimited by the said masses and filled with a second fluid different from the first fluid, the second cavity being disposed generally inwardly of the first cavity.

The invention enables the viscous damping means to be isolated from the rest of the assembly so that it can be filled with a fluid which is different from the fluid used for lubricating the resilient means. If a high viscosity damping fluid is used, the viscous damping means may be housed within a small volume while still achieving a high level of damping.

It will be appreciated that the arrangement according to the present invention is economic, since with a high viscosity fluid, manufacturing tolerances for the viscous damping means can be quite wide.

In addition, there is no risk of pollution of the viscous damping means, which is provided with calibrated passages, by particles arising from wear in the various members and particularly in connection with the resilient means. As a result, the viscous damping means is able to display operating characteristics which remain stable over a long period.

The cavity of the viscous damping means if preferably only partially filled.

It is possible to obtain simultaneously a damping torque, and therefore a hysteresis effect, which is low for small displacements between the two masses but large for greater displacements. In this way, the vibrations are well damped, for example at the dead point during braking. starting and stopping the engine of the vehicle.

The viscous damping means, although it may be disposed radially outside the resilient means, is preferably arranged close to the axis of rotation of the double flywheel, radially inward of the resilient means. This affords protection to the joints, and also renders the viscous damping means more effective when the vehicle is being started, especially when the cavity of the viscous damping means is partially filled.

According to another feature of the invention, the second sealed cavity may be associated with a damper plate forming part of the second mass and arranged to act on the resilient means. This damper plate, which is preferably flat, can serve as an axial spacer between two members which are formed with transverse walls delimiting the viscous damping (second) cavity.

The second cavity may be closed at its inner periphery by a central hub, which is provided with teeth, each of which is located circumferentially between two further teeth formed on the inner periphery of the damper plate.

The damper plate enables close manufacturing tolerances to be obtained, particularly when cutting out and setting up the damper plate. It is also possible readily to make a sub-assembly of the damper plate with the means defining the second or viscous damping cavity, which can be arranged in the interior of a hollow member and closed by a cover member, both the hollow member and the cover member then being part of the other, or first, mass.

Problems of assembly and filling are also simplified.

According to another feature, the double flywheel is provided with phasing rings so as to reduce the axial bulk of the double flywheel according to the invention, without reducing the angular displacement between the two masses.

The description which follow describes preferred embodiments of the invention, given by way or example only and with reference to the accompanying drawings.

BRIEF DESCRIPTION OF THE DRAWINGS

FIG. 1 is a view in axial cross-section of a damped flywheel according to the invention, especially suitable for use in an automobile.

FIG. 2 is a view of one half of the damped flywheel, seen in cross-section taken on the line II—II in FIG. 1.

DESCRIPTION OF PREFERRED EMBODIMENTS

Figure 4:
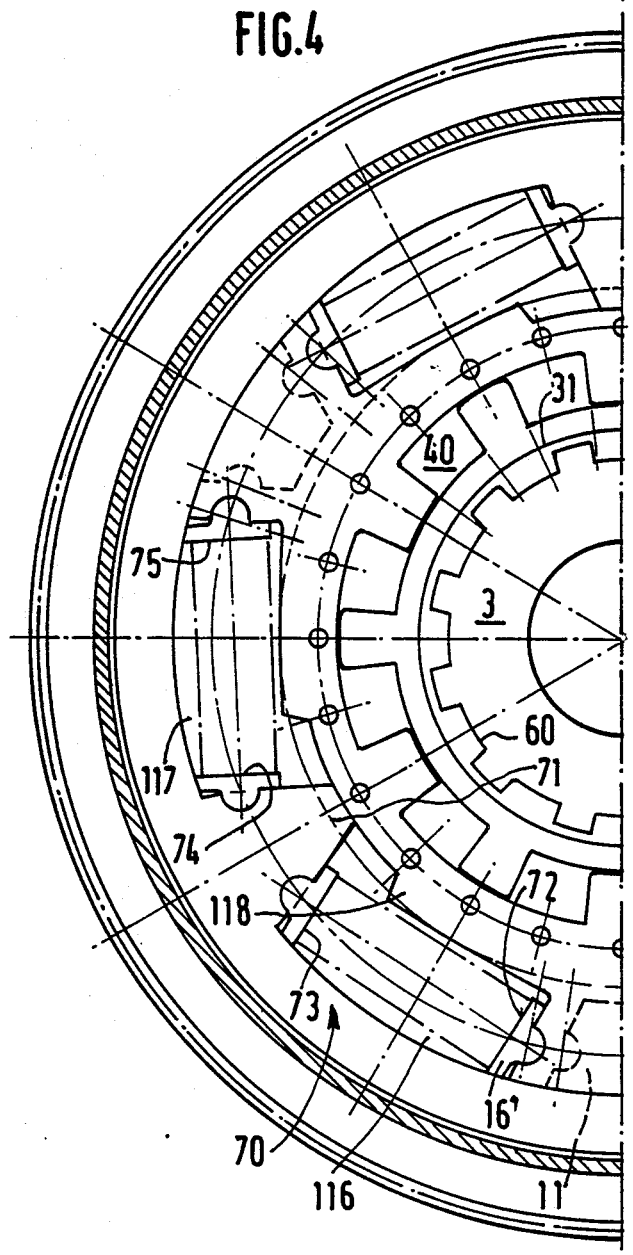
FIGS. 3 and 4 are views similar to FIGS. 1 and 2, but show a second embodiment.

The first one of the masses constituting the damped flywheel is shown at 1 in FIG. 1. It comprises a transverse or radial face plate 2 and a central hub 3, secured to the nose of the crankshaft A of the engine of the vehicle by means of threaded fasteners (not shown)

which extend through openings 4 and 5 formed in the face plate 2 and hub 3.

The face plate 2 is preferably flat, and is secured by means of screws 6 to a hollow member 7 having a radial body portion 8 and an axially extending wall portion 9. The wall portion 9 carries a gear ring 10 and is provided with threaded blind holes for the screws 6. It acts as a spacer between the face plate 2 and body portion 8, which are parallel to each other.

Guide rings 11 and 12, which in this example comprise a plurality of blocks, are sealingly fixed by means of rivets on to one face plate 2 and body portion 8 respectively.

The second mass 14 includes a damper plate 13, which is disposed axially between the face plate 2 and body portion 8 of the first mass, and is provided with openings 15 for accommodating circumferentially acting resilient means 16. In this example these resilient means consist of coil springs. They are operatively interposed between the two masses 1 and 14. More particularly, the springs 16 are mounted without clearance in the openings 15 by means of pivotable inserts 16', and, in the rest position, the springs are mounted between the rings 11 and 12 with an endwise clearance.

The second mass 14 also includes a plate 17 constituting a reaction plate, on which the friction disc (not shown) of the clutch of the vehicle is arranged to come into contact. The friction disc is secured to the input shaft 18 of the vehicle gearbox for rotation with it. A bearing 19 is interposed radially between the plate 14 and the hub 3.

In accordance with the invention, the resilient means 16 are disposed within a first sealed cavity 20, which is filled with a first fluid and which is delimited by the two masses 1 and 14. A viscous damping means, generally indicated at 30, is mechanically interposed between the two masses 1 and 14, and comprises a second sealed cavity 40 which is filled with a second fluid, different from the first fluid mentioned above. The cavity 40 is delimited by elements of the two masses 1 and 14, and is located generally inwardly of the first cavity 20, i.e. in this example it is generally both within the axial length of the first cavity and radially inward of it.

In this example, the cavity 20 is delimited by the face plate 2, the body portion 8, and the hub 3 of the first mass 1, and by a disc 31 of the second mass 14. The disc 31 is secured to the reaction plate 17 by riveting. One of the sealing joints of the cavity 20, which is filled with a lubricating fluid, can be seen at 21.

The viscous damping or second cavity 40 is delimited by the disc 31, the flat damper plate 13, a second disc 32 of the second mass 14, and the hub 3 of the first mass 1, joints 33 are provided for sealing this cavity 40.

The disc 32 is fixed to the disc 31 by means of screws 34 which extend through openings provided for this purpose in the damper plate 13. It will be understood from the foregoing that the damper plate 13 constitutes an axial spacer means for the disc 31 and 32, the cavity 40 being located close to the axis of rotation X–X' and radially inwardly of the springs.

The damper plate advantageously carries at its inner periphery a set of radially orientated teeth 41, which extend into the interior of the cavity 40 towards the axis X–X'.

The hub 3 has a set of teeth 42 on its outer surface. These teeth 42 are also orientated radially, and extend into the cavity 40 towards the damper plate 13. The teeth 41 and 42 are of fin-like form.

As can be seen from FIG. 2, the teeth 42 are arranged alternately, considered circumferentially, with the teeth 41, with which they define a set of calibrated passages. Each of these passages comprises the space between one of the teeth 41 and the next tooth 42, and extends (a) between the teeth 42 and the inner periphery 43 of the damper plate, (b) between the teeth 41 and the outer periphery 44 of the hub 3, and (c) between the teeth 41 and the discs 31 and 32. All of these elements together define the second cavity 40 and the damping means 30 within which the damping means are confined. It will be noted that the clearance between the teeth 41 and the discs 31 and 32 is very small.

The cavity 40 is preferably filled partially with a second fluid having a high viscosity, such as a silicone. Considering the chamber B, C and D (FIG. 2) defined between two consecutive teeth 41, 42, it will be understood that during rotation of the damper plate 13 in the direction of the arrow f in FIG. 2 with respect to the hub 3, the chamber C becomes pressurised while the chambers B and D become de-pressurised, so that air is transferred between these chambers.

Once a particular degree of rotation has been achieved, the chamber C is completely full of fluid, which is then transferred into the chambers B and D via the appropriate calibrated passage described above. The mode of operation then changes from one in which air is flowing through the calibrated passage to one in which a viscous fluid is flowing, and the damping torque thereby changes from a low value to a high value. As already noted, viscous damping takes place entirely within the cavity 40.

Finally, it will be noted that one of the joints 21 is disposed between the inner periphery of the body portion 8 and an axial flange portion 35 of the disc 31; and also that this flange portion 35 engages on an axial flange portion 36 of the reaction plate 17. The bearing 19 is mounted between the flange portion 36 and the hub 3.

Assembly is carried out as follows. The reaction plate 17 is assembled with the disc 31 by riveting, and the bearing 19 is fitted. The hub 3 is then mounted in the bearing 19. The resulting sub-assembly is then fitted in the central opening of the body portion 8 of the hollow member 7, or vice versa, after which the damper plate 13, already carrying the springs 16, is fitted. The springs 16 are subsequently easily fitted, with a clearance, in the guide rings 11 and 12.

With the joint 33 associated with the disc 31 maintained under pressure, the cavity 40 is filled, preferably only partially, with its fluid, and is then closed by the disc 32 and screws 34. Finally, the cavity 20 is filled with a lubricating fluid for the springs 16.

It should be noted that during filling, the face plate 2 and hub 3 are clamped together with a retaining rang 50. After the filling operation has been completed, these three components are secured together by means of rivets 51, or, in a modification, by means of threaded fasteners.

Figure 3:
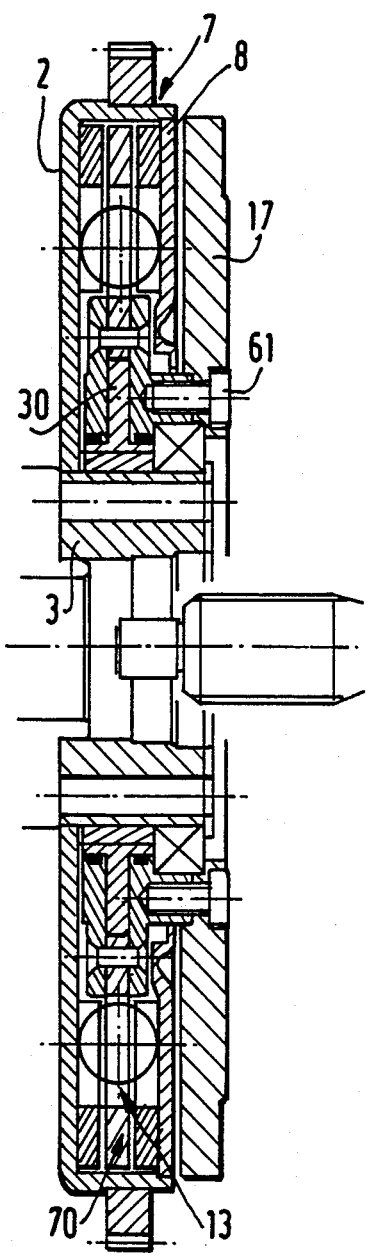

The embodiment shown in FIGS. 3 and 4 differs from the embodiment described above mainly in the form of construction of the sub-assembly which defines the viscous damping cavity 40.

It will be noted that the element 8, in FIG. 3, is now in the form of a generally flat face plate, and that the hollow member 7 is no longer relatively heavy. It also includes the face plate 2. It is thus the face plate 8 that here forms a shroud for the spring housing cavity 20.

The hollow member 7 may in this embodiment be made of sheet metal.

It will also be noted that a separate hub ring 3' is mounted on the hub 3 by means of interlocking sets of teeth 60.

It is thus possible to build a sub-assembly comprising the viscous damping means 30, the other elements defining the cavity 40, and the damper plate 13, with a phasing ring 70 to be described below, the springs being mounted without clearance in the sub-assembly. This sub-assembly is then mounted in the member 7 on the hub 3.

The reaction plate 17 is then finally mounted on the bearing 19 and the disc 31 by means of screws 61, after the cavity 20 has been filled and the face plate 8 secured as a cover plate by means of welding.

The purpose of the phasing ring 70 is to increase the degree of displacement. The ring 70 includes a set of lugs 71. If two consecutive springs, 116, 117 are considered, the end 72 of the spring 116 bears through the inserts, 16', on the damper plate 13, while its other end 73 bears on one of the lugs 71 of the phasing ring 70. The spring 117 bears on the lug 71 at its end 74, and on the damper plate 13 at its other end 75.

It will be seen that the lugs 71 are arranged alternately, considered in the circumferential direction, with the blocks which constitute the guide rings 11 and 12; and that the phasing ring 70 lies in the same plane as the damper plate 13.

The spring 116 is less stiff than the spring 117, while the teeth 118 of the hub 13 are arranged so as to cooperate with the lug 71 so as to drive the phasing ring 70 and compress the spring 117 (i.e. the stiffer spring) after the clearance between the damper plate 13 and the guide rings 11 and 12 has been taken up. This arrangement has the effect of increasing the amount of angular displacement even more.

As a result of these arrangements, it becomes possible to obtain a high displacement with no greater bulk in the axial direction than for an unlubricated double flywheel. Thus, for a give axial spacing when the coil springs 16 are housed in the sealed cavity 20, the diameter of the springs can be reduced.

It also becomes possible no longer to observe specifications, particularly in respect of the torque and angular displacement to be achieved between the two masses.

The phasing means enable the same torque to be ultimately transmitted, while at the same time having at least the same relative angular displacement between the two masses.

The present invention is of course not limited to the embodiments described above, but embraces all variations in particular, the two springs 116 and 117 may be identical to each other.

What is claimed is:

1. A double damped flywheel for an automotive vehicle, said flywheel comprising a first mass and a second mass coaxial with said first mass, said masses being mounted for relative rotation with respect to each other against the action of resilient means, said masses delimiting a first sealed cavity, mounting means for mounting said resilient means within said first sealed cavity, said first sealed cavity being filled with a first fluid, viscous damping means being mechanically interposed between said two masses and comprising elements of said two masses to define together a second sealed cavity, said second sealed cavity being disposed generally inwardly of said first sealed cavity, said second sealed cavity being filled with a second fluid, said second fluid being different from said first fluid, said second sealed cavity being located close to the axis of rotation of said double flywheel, radially inwardly of said resilient means.

2. The double damped flywheel according to claim 1, wherein said first mass includes a pair of radial plate elements spaced axially apart and closing said first sealed cavity, said second mass includes a damper plate disposed axially intermediately between said radial plate elements, and said viscous damping means comprises means fixed to said damper plate.

3. The double damped flywheel according to claim 2, wherein two discs are disposed on either side of said damper plate and carried thereon, said disc delimiting said second sealed cavity.

4. The double damped flywheel according to claim 2, wherein a hollow member includes one of said radial plate elements, said first sealed cavity is defined within said hollow member is closed by cover means comprising the other of said radial plate elements.

5. A double damped flywheel according to claim 1, wherein said second mass including a damper plate defining a plurality of housing means, said first mass including guide rings and said resilient means being mounted in said housings and in said guide rings, and a phasing ring being interposed between two consecutive said resilient means.

* * * * *